UNITED STATES PATENT OFFICE.

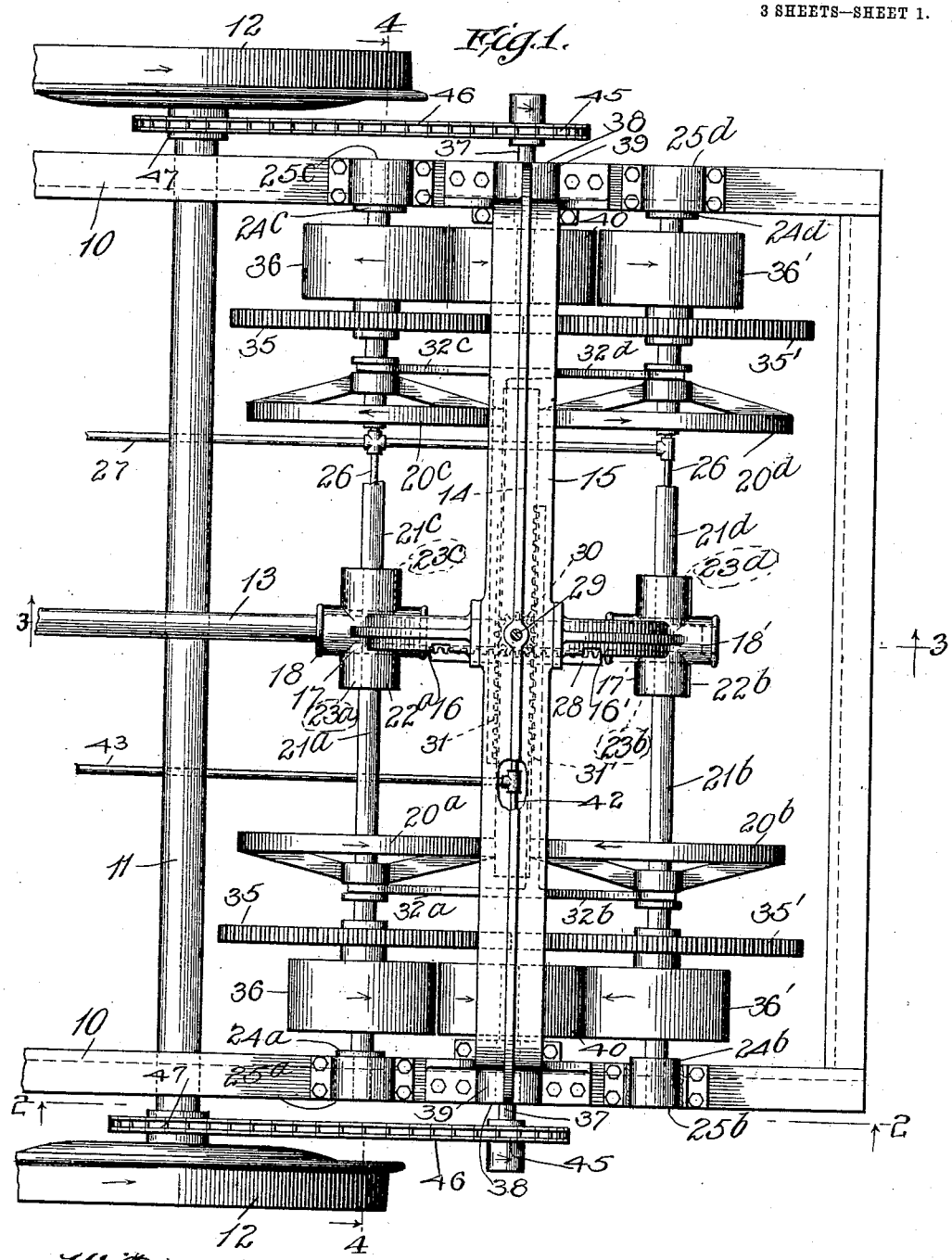

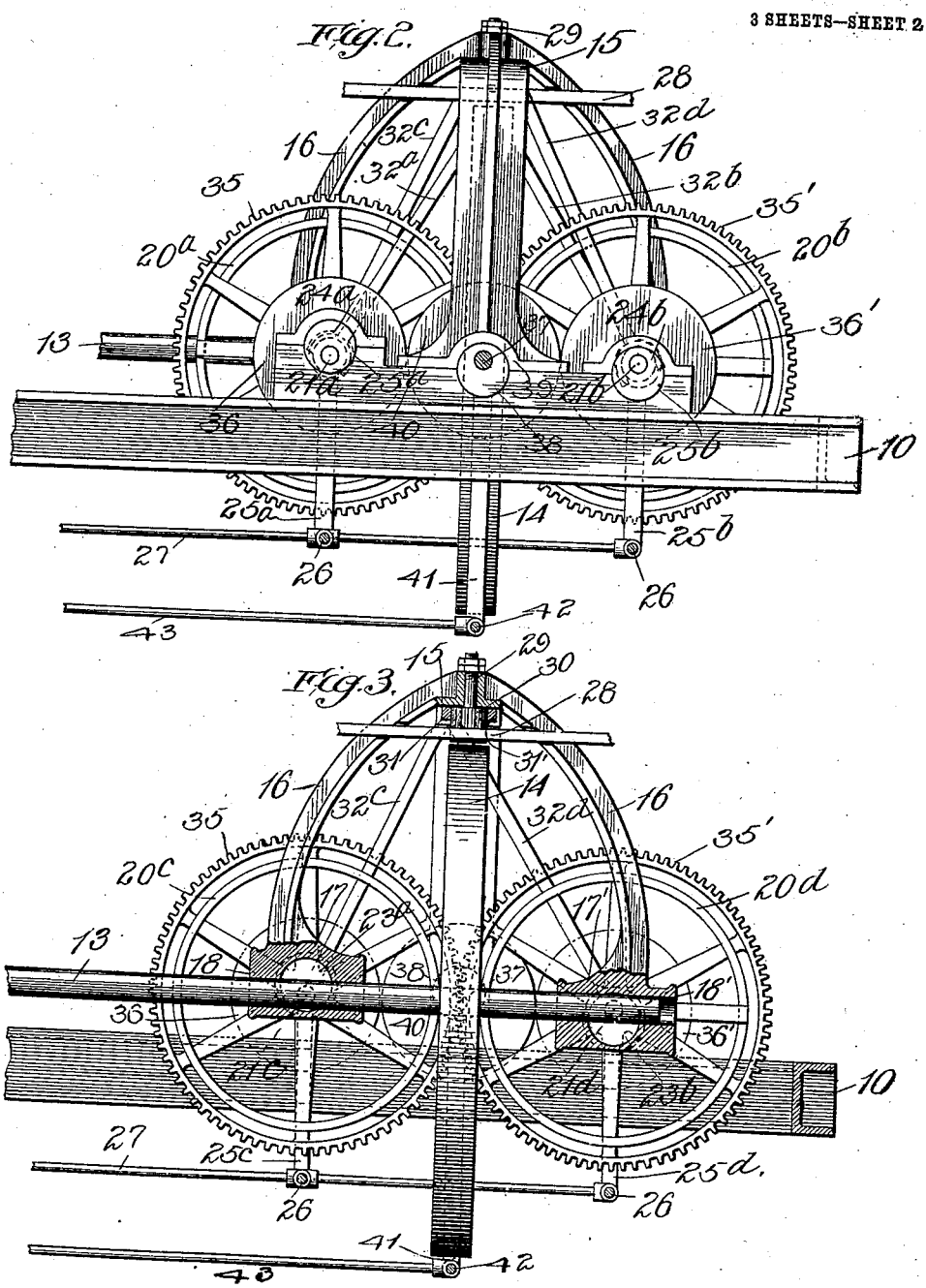

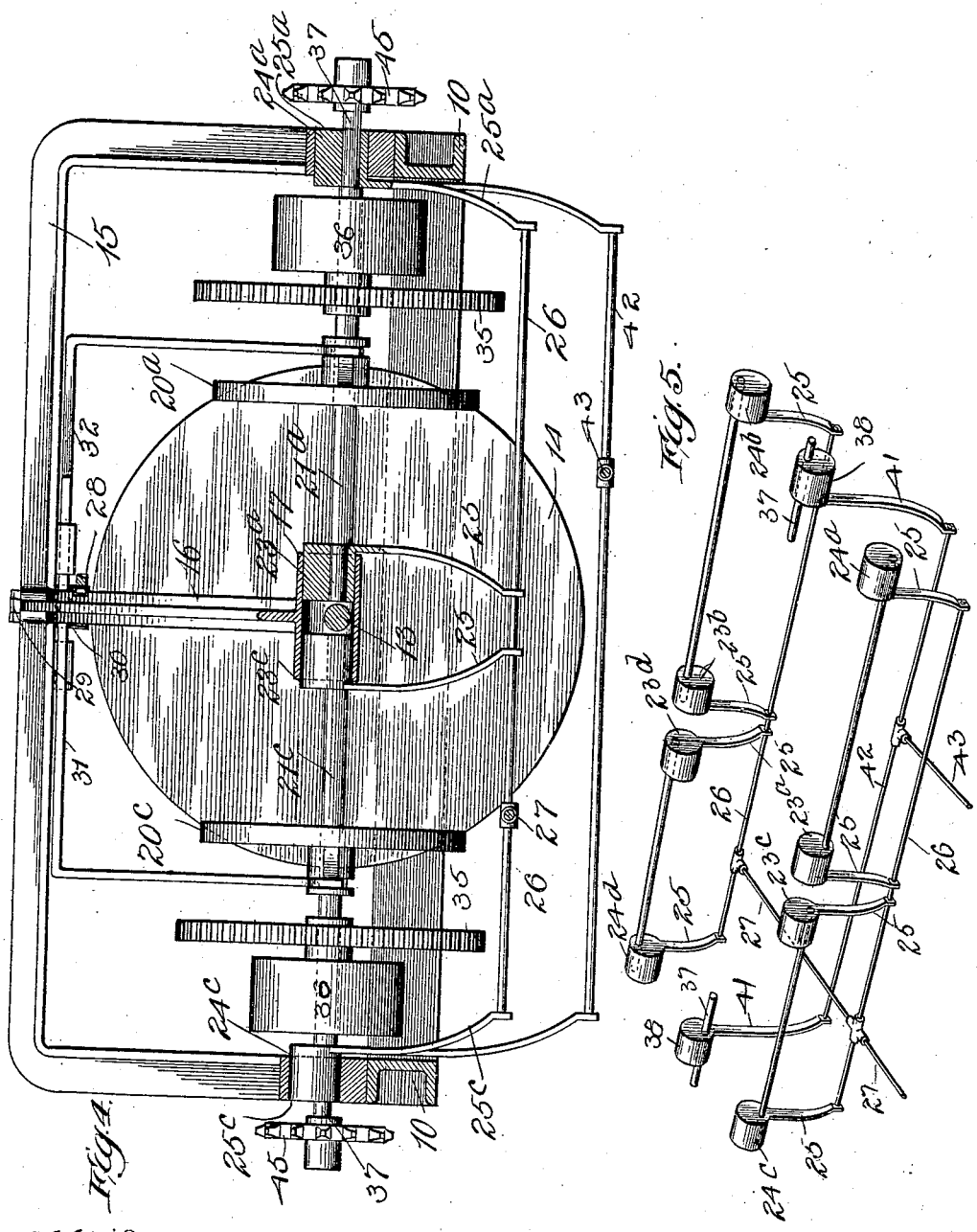

JAMES K. COCHRAN, OF CHICAGO, ILLINOIS.

POWER-TRANSMISSION MECHANISM.

No. 860,903.  Specification of Letters Patent.  Patented July 23, 1907.

Application filed March 29, 1907. Serial No. 365,262.

*To all whom it may concern:*

Be it known that I, JAMES K. COCHRAN, a citizen of the United States, residing at Chicago, in the county of Cook and State of Illinois, have invented certain new and useful Improvements in Power-Transmission Mechanisms, of which the following is a specification.

My invention relates to friction power transmission mechanisms, and more particularly to power transmission mechanism for heavy work, such as driving street or railway cars, trucks, and the like.

One of the salient objects of my invention is to provide a power transmission mechanism wherein both faces of a primary or driving friction disk are utilized to impart rotation to coacting driven wheels, and wherein the relative arrangement of disk and wheels is such as to produce perfect balance of pressure upon the driving elements, freeing the shaft and disk from end thrust and from all strains tending to distort them.

A further object of my invention is to provide simple and efficient mechanism for interconnecting the various driven elements of the gearing for the application of the power transmitted through all of the driven wheels to produce unidirectional movement of one or more power utilizing elements.

A yet further object of my invention is to provide a construction of the character described, which is simple, efficient, and reliable.

Other and further objects of my invention will best become apparent from the following description, taken in conjunction with the accompanying drawings, wherein I have illustrated an embodiment of my invention in the form of a power transmission mechanism as applied to a car truck. It will be understood, however, that I do not intend to limit the use of my invention to any particular field, as it may be employed wherever an efficient frictional power transmission device is desired.

In the drawings; Figure 1 is a plan view of a fragment of a car truck equipped with frictional power transmission embodying my invention; Fig. 2 is a side elevation of the same; Fig. 3 is a section on line 3—3 of Fig. 1, and; Fig. 4 is a transverse section on line 4—4 of Fig. 1; Fig. 5 is a diagrammatic illustration showing the relation of certain operating cams conveniently employed in the embodiment of my invention.

Throughout the drawings like numerals of reference refer always to like parts.

In the drawings, 10 indicates a frame, and 11 an axle suitably mounted therein, and connected with traction wheels 12—12, such axle and wheels typifying any suitable power utilizing element, or elements.

13 indicates a power shaft supporting at a suitable point a driving disk 14, having both its plane faces adapted to act as frictional driving surfaces.

For convenient disposition of the operating mechanisms employed in the transmission installation I prefer that support should be afforded the driven shaft 13, through the medium of an arch or yoke 15 bridging from side to side of the frame 10 above the driving disk 14, and having depending therefrom at its center arms 16—16 provided at their ends with bearing heads 17 and 17' respectively, providing alining bearings 18 and 18' for the power shaft 13 on opposite sides of the friction disk.

In association with the double faced driving disk are four driven wheels $20^a$, $20^b$, $20^c$ and $20^d$, arranged in two pairs, whereof the wheels of each pair coact respectively with opposite faces of the driving disk, and whereof the wheels of the two pairs coacting with the same face of the driving disk are arranged in diametric line on opposite sides of the axis of rotation of the driving disk, and always at equal distances from such center of rotation. To this end the wheels $20^a$, etc., are mounted on four independently supported driven shafts $21^a$, $21^b$, etc., the shafts $21^a$ and $21^c$ alining with each other in parallelism with one face of the driving disk, and the remaining shafts alining with each other in parallelism to the opposite side of the friction disk. Each of the driven wheels is mounted for rotation with, but sliding for movement longitudinally of its supporting driven shaft, as by the customary spline connection.

To provide for the support of the inner ends of the respective driven shafts $21^a$, etc., I provide bearing projections $22^a$, etc., upon the appropriate bearing heads 17 and 17' and mount for oscillation in such heads eccentrics $23^a$, etc., in which the shafts $21^a$, etc., are eccentrically journaled. The outer extremities of the respective shafts are mounted in corresponding eccentrics $24^a$, etc., journaled in suitable bearings $25^a$, etc., and supported by the frame 10.

The arrangement of the eccentrics is preferably such that the shafts $21^a$, etc., are maintained in constant parallelism to each other and to the driving surface of the driving disk, and that all of the shafts are simultaneously and bodily moved in unison toward or away from the driving disk, so that all of the driven wheels $20^a$, $20^b$, etc., are simultaneously brought into contact with the driving disk or removed from contact therewith. To this end the arrangement of the cams is preferably that indicated in Fig. 5, the shaft centers of all of the eccentrics on one side of the driving disk being below the centers of the eccentrics themselves, and the centers of both shafts on the opposite side of the driving disk being above the centers of their eccentrics. All of the shaft centers are in a plane with the driving shaft axis.

To provide a convenient mechanism for bodily moving the shafts coincidentally and simultaneously I provide each eccentric with a depending arm, as shown at $25^a$, etc., and connect all of the alining arms together as by rods 26, and effect connection through a rod 27 between the two rods 26, so that by reciprocating movement of rod 27 simultaneous and bodily movements of the shaft may be accomplished.

The sliding movement of all of the driven wheels upon their respective shafts must also be equal and simultaneous, and may be accomplished in any approved manner, the mechanism for obtaining this end, which I have herein shown comprising an operating rod 28 provided with rack teeth engaging a pinion 30 mounted on a vertical shaft 29 located centrally of the yoke 15, with which pinion 30 there meshes, on opposite sides thereof two rack bars 31, and 31′, disposed transversely of the frame, the rack bar 31′ having at one extremity two shipper arms 32ª and 32ᵇ respectively, coacting in usual manner with the hub of friction wheels 20ª and 20ᵇ, so that such wheels may be moved thereby longitudinally of their shafts. The other rack bar 31 has like shipper arms 32ᶜ and 32ᵈ, coacting with the pair of driven wheels 20ᶜ and 20ᵈ, and it will be obvious to those skilled in the art that movement of the controlling rod 28, rotating pinion 30 effects opposite sliding movements of rack bars 31 and 31′, which simultaneously and equally shift the several driven wheels in like direction radially of the driving disk and to equal extent.

For transmitting the power from both driven wheels of a pair to a common point of utilization, I provide, upon the shafts of such pair, gears arranged to intermesh when the driven wheels are in operative relation to the driving disk, and I further provide a countershaft and variable connections whereby the countershaft may be operatively connected with either of the driven shafts of the pair.

In the embodiment shown the mechanism on the two sides of the transmission are identical in construction, and I will, therefore, describe only one.

35 and 35′ indicate spur-gears mounted respectively on shafts 21ª and 21ᵇ and arranged to intermesh when the driven wheels make contact with the surface of the driving disk.

36 and 36′ indicate flat faced friction rolls mounted on shafts 21ª and 21ᵇ respectively, and 37 indicates a counter-shaft journaled eccentrically in an eccentric 38 mounted in a suitable bearing 39 provided therefor on the side frame 10.

40 indicates a friction roll interposed between rolls 36 and 36′, and arranged for contact with either thereof accordingly as the eccentric 38 is shifted to throw the shaft center to one side or the other of the eccentric center.

While I have herein shown the friction roll gearing as comprising coacting rolls of substantially equal size to produce no change in speed relation between the counter-shaft and driven shaft it will be apparent that the size relations of the coacting rolls may be varied for either reduction or increase of the speed of the countershaft with respect to the speed of either driven shaft.

It will be observed that in order that the two countershafts 37 shall rotate in like direction, the friction rolls 40 on opposite sides of the machine should coöperate one with a friction roll 36 and the other with a friction roll 36′, and, therefore, where one or more parts are to be driven in like direction from the countershaft, as in the car truck construction illustrated, I arrange the center of one eccentric above its countershaft center and the center of the other eccentric below its shaft center. Such arrangement is illustrated in Fig. 5, and for coincident operation the eccentrics 38 are provided with depending arms 41 connected as by a rod 42, to which is secured an operating rod 43, the arrangement being such that movement of rod 43 in one direction throws one friction roll 40 into connection with its roll 36, and the other friction roll 40 into connection with its roll 36′ while opposite movement of the rod 43 reverses such conditions.

For transmitting the power from both countershafts to the single power utilizing element I provide on each power shaft the gear 45 connected by chain 46 with a sprocket 47 connected with a traction wheel 12 on the corresponding side of the car.

It will now be apparent that in the operation of the device movements of the rack bar 28 will produce sliding movements of the driven wheels upon their shafts toward and from the rotation of the driving disk to control the speed of rotation of the driven shafts; and proper movement of the rod 27 will throw the driven wheels simultaneously into contact with the driving disk. The arrangement of the driven devices is such that the pressure applied by each wheel is balanced by the pressure of another wheel applied at an exactly opposite point, there being no resultant unbalanced pressures upon the driving disk and no end thrust upon the driving shaft.

Operation of the rod 43 throws the countershaft rolls 40 into connection with the driven rolls to produce forward or reverse motion of the countershafts and the connected power utilizing devices or movement of such rod to a mid-position disconnects the driven shafts from the countershaft.

While I have herein described in some detail one embodiment of my invention, it will be obvious to those skilled in the art that numerous changes in the specific construction might be made without departure from the spirit and scope of my invention, and I do not desire, therefore, to be understood as limiting my invention to the specific construction described further than as specified in the claims.

Having thus described my invention what I claim and desire to secure by Letters Patent, of the United States, is:

1. A power transmission device comprising, in combination, a double faced friction disk, and two diametrically opposed pairs of friction wheels, all simultaneously coacting therewith, the wheels constituting each pair being disposed for rim to face contact with like points on opposite faces of the disk.

2. In a power transmission device, the combination of a double faced friction disk, diametrically opposed pairs of friction wheels whereof the wheels constituting a pair are disposed for rim to face contact with opposite faces of the disk, and means for moving all of said wheels cotemporaneously into or out of contact with the disk.

3. In a power transmission device, the combination with a double faced friction disk, diametrically opposed pairs of friction wheels whereof the wheels constituting a pair are disposed for rim to face contact with opposite faces of the disk, means for simultaneously moving all of said wheels into or out of contact with the disk, and means for simultaneously and equally moving all of the wheels transversely of the disk toward or from its center.

4. In a power transmission device, the combination of a double faced friction disk, two diametrically opposed pairs of friction wheels, whereof the wheels constituting a pair are disposed for rim to face contact with the opposite faces of the disk, independent shafts for said several wheels, means for moving all of the said shafts simultaneously toward and from the disk and positive gearing connecting the shafts of each pair of wheels.

5. In a power transmission device, the combination of a double faced friction driving disk, four driven wheels arranged for peripheral contact with the faces of said disk, one pair of said wheels being arranged for contact with opposite surfaces of the disk on the same side of its axis, and the other pair being similarly arranged on the opposite side of the wheel axis in diametrical line with the first said pair, and independent driven shafts for each driven wheel, a power utilizing element, and means for transmitting unidirectional motion from both driven shafts of each pair to said power utilizing element.

6. In a power transmission device, the combination of a double faced friction disk, diametrically opposed pairs of friction wheels, whereof the wheels constituting each pair are disposed for rim to face contact with opposite faces of the disk, positive gearing connecting the shafts of each pair, power utilizing elements and means for transmitting unidirectional motion from said interconnected shafts of both pairs cotemporaneously to said power utilizing elements.

7. In a power transmission device, a double faced driving disk, a pair of driven friction wheels arranged on the same side of the axis of rotation of the disk, for simultaneous contact with opposite faces of said disk, shafts for said driven wheels, and reversing mechanism comprising driving elements, one connected with each driven shaft, and a driven element movably mounted between said driving elements, and means for moving said driven element into coöperative relation to either said driving elements.

8. In a power transmission device, a double faced driving disk, a pair of driven wheels arranged for peripheral contact with opposite surfaces of said driving disk on the same side of the axis of rotation of said disk, independent shafts for said driven wheels, positive gearing connecting said driven shafts, a countershaft and means for connecting said countershaft with either of the said driven shafts, whereby direction of rotation of said countershaft may be reversed.

9. In a power transmission device, a double faced driving disk, a pair of friction wheels, arranged on the like side of said friction disk with respect to its axis of rotation, and equidistant from such axis, and arranged for edge to face contact with opposite driving surfaces of said disk, independent shafts for said driven wheels, gear connections between said driven shafts, friction rolls on said driven shafts, a counter shaft, and a friction roll on said countershaft movable into coöperative association with the friction roll on either driven shaft.

10. In combination with a power shaft and an element to be driven, a friction power transmission mechanism comprising a double faced driving disk on the power shaft, four driven wheels arranged in diametrically opposite pairs, whereof the wheels of a pair are disposed for rim to face contact with like points on opposite faces of the disk, independent driven shafts for the four driven wheels, gearing connections between the shafts of each pair of driven wheels, two countershafts connected with the element to be driven, and means for simultaneously connecting said two countershafts with those driven shafts of the opposite pairs rotating in like direction.

11. In a power transmission device, a power shaft, a double faced friction disk thereon, a yoke spanning the friction disk in parallelism to its plane of rotation, arms extending from said yoke on opposite sides of said frame member in alinement with the power shaft, power shaft bearings in said arms, bearings in said arms at right angles to the power shaft, four shafts transverse to the power shaft, whereof two are proximate to each surface of the disk, on opposite sides of its axis of rotation, and whereof all bear at their inner ends in the bearings provided in the depending arms, friction wheels mounted on said shafts and making edge to face contact with the driving disk, said wheels being arranged in diametrically opposite pairs with the wheels of each pair bearing at like points on opposite surfaces of the driving disk.

12. In a power transmission device, the combination of a double faced friction disk, diametrically opposed pairs of friction wheels whereof the wheels constituting a pair are disposed for rim to face contact with opposite faces of the driving disk, and means for simultaneously transmitting power from all of said driven disks to a common element to be driven, to drive said element in one direction.

In testimony whereof I hereunto set my hand in the presence of two witnesses.

JAMES K. COCHRAN.

In presence of—
  GEO. T. MAY, Jr.,
  MARY F. ALLEN.